United States Patent Office

3,586,729
Patented June 22, 1971

3,586,729
PROCESS AND CATALYSTS FOR CONVERTING HYDROCARBONS, PARTICULARLY BY ALKYLATION AND POLYMERIZATION
Bernard Juguin and Jean François Le Page, Rueil-Malmaison, France, assignors to Societe Francaise des Produits Pour Catalyse, Rueil-Malmaison, Hauts-de-Seine, France
No Drawing. Filed May 16, 1969, Ser. No. 825,423
Claims priority, application France, May 16, 1968, 152,129
Int. Cl. C07c *3/54, 3/16*
U.S. Cl. 260—671                             12 Claims

ABSTRACT OF THE DISCLOSURE

For the alkylation of aromatic hydrocarbons, or for producing oligomers from olefins, there is employed an improved catalyst resulting from the impregnation of a silica carrier with phosphoric anhydrides or a precursor thereof, and the subsequent calcination of the impregnated carrier, said carrier consisting of agglomerates of microballs of silica hydrogel, having a size on the order of about 100–800 microns. The microballs have a specific surface of preferably 200–300 m.$^2$/g. and a pore volume between 1 and 1.5 cm.$^2$/g. The preferred molar ratio of phosphoric anhydride to silica is 0.7–1.5, and the preferred calcination temperature is 200–700° C.

---

This invention relates to a process for converting hydrocarbons, particularly to a process and catalysts for converting ethylenic and/or aromatic hydrocarbons by alkylation and polymerization.

It is well-known that olefins containing 2 to 6 carbon atoms, such as ethylene, propylene, 1-butene, 2-butene, isobutene, pentenes and hexenes, may be polymerized to give oligomers having from 4 to 30 carbon atoms, or react with aromatic hydrocarbons to give alkylaromatic hydrocarbon such as ethylbenzene, cumene or butylbenzene.

The catalysts usually employed in these reactions are well-known: they are obtained by admixing phosphoric acid with conventional carriers such as kieselguhr, alumina, magnesia and silica obtained, for example, by agglomerating particles of silica gel or silica-alumina.

The catalysts suffer from many inconveniences, for example a rather low reactivity, a high sensitivity to the water content of the feed charges; poor mechanical properties, particularly a low resistance to the crushing grain to grain, amounting as an average to about 6 to 12 kg.; these various inconveniences are very often responsible for the short life of catalysts of this type, and also for occlusions of the industrial devices. These catalysts also generate undesired side-reactions, for example cracking, aromatization, hydrogen transfer, a formation of polyunsaturated compounds such as dienes and trienes, although the desired product is a monoethylenic oligomer or a monoalkyl aromatic hydrocarbon; these side-reactions are responsible of the lower yield of these processes, so that the latter as well as the employed catalysts are less attractive than expected.

This is also true of the catalysts obtained from conventional carriers of silica impregnated with phosphoric acid, which are subjected to calcination, after impregnation, at a high temperature, for example higher than 540° C., and which further exhibit a high content of phosphoric anhydride, since these catalysts are not sufficiently free from the above-inconveniences.

The catalysts of this invention are substantially free from these inconveniences; they also have a wide range of uses according to their calcination temperature which may vary, for example, between 200 and 700° C.

Thus they made be used, for example:

For producing gasoline of high octane number by polymerization of light petroleum gas.

For producing nonenes by polymerization of propylene, said nonenes being used as raw materials for manufacturing detergents of the nonyl-phenol type.

For producing dodecenes by polymerization of propylene, the dodecenes also being raw materials for producing detergents of the dodecyl-benzene sulfonate type.

For producing oligomers having 13 to 25 carbon atoms by polymerization or copolymerization of propylene and/or butenes; these oligomers are raw materials for manufacturing transmission fluids.

For producing heptenes by codimerization of propylene and butenes; these heptenes may be converted by oxo-synthesis to octanols which are raw materials for manufacturing plasticizers.

For producing cumene by alkylation of benzene with propylene; cumene may be used for increasing the octane number of gasoline or as a raw material for manufacturing phenol and acetone.

For manufacturing ethylbenzene by alkylation of benzene with ethylene; ethylbenzene is a raw material for producing styrene by dehydrogenation.

The catalysts of this invention may be obtained by impregnating, by means of phosphoric anhydride or any compound convertible to phosphoric anhydride, a silica carrier manufactured according to the process of the French patent specification No. 1,544,156 relating to "Corps agglomérés siliceux."

According to this patent, carriers may be manufactured by agglomeration of microballs of silica hydrogel, for example by extrusion or by means of a rotatable granulator. It has been discovered that, when agglomerating silica carriers, the use, at least partial, of silica in the form of hydrogel microballs results in a substantial increase of the mechanical resistance of the resulting bodies. These microballs may be obtained, for example, by coagulation of a silica sol in a liquid which is substantially immiscible with water, such as trichloroethylene.

The microballs of silica hydrogel may be thereafter washed by means of an ammonia solution in a basic medium (the pH of the solution is usually between 8 and 11). This washing under alkaline conditions results in agglomerates of high mechanical strength. The silica sol may be prepared by reacting an acid (for example HNO$_3$, H$_3$PO$_4$ or H$_2$SO$_4$) with sodium silicate.

The microballs of silica hydrogel have diameters of about 100 to 800 microns.

For manufacturing silica agglomerates, most of the known agglomeration processes may be used. However, irrespective of the process employed, the strains applied to the microballs must not be too strong, in order that the bodies be not substantially crushed; it is only necessary that the balls be firmly pressed against each other without excessive turbulence.

According to this process, the agglomerates of microballs of silica hydrogel may exhibit simultaneously a large specific surface (for example 200–300 m.$^2$/g. or more), a large porous volume (for example 1–1.5 cm.$^3$/g.) and a high mechanical strength. The latter property remains, often increased, in the catalysts of this invention. Furthermore, the obtained catalysts have usually a higher activity and selectivity than the known catalysts.

According to this invention, P$_2$O$_5$ is usually introduced by impregnating the silica agglomerates according to the latter patent with solutions of precursors of phosphoric anhydride, for example ortho-, pyro-, meta-, poly- or super-phosphoric acids.

Amongst the carriers disclosed in the said French patent, there will be preferably used those having a low content of alkali-metal compounds, for example less than 2% by weight expressed as $Na_2O$, and preferably less than 1%.

This low content of alkali-metal compounds of the carriers may be easily obtained, for example by washing microballs of silica hydrogel with water before their agglomeration. Once impregnated, the carrier is dried and then heated by means of an air current, in a reaction vessel, preferably of the rotatable or stirred type, so as to avoid any sticking of the catalyst.

The best catalysts have been obtained in the following manner:

(1) Impregnation of silica extrudates by means of heated solutions of super-phosphoric acids,
(2) Centrifuging
(3) Heating in an air current at about 200 to 700° C., preferably in a rotating oven.

The resulting catalyst contains phosphoric anhydride in a molar ratio of $P_2O_5$ to $SiO_2$ usually between 0.7 and 1.5.

The operating conditions must be selected carefully since, according to the required product, the reaction temperature is, for example, between 140 and 350° C., for hourly volumetric feed rates of liquid olefinic or aromatic hydrocarbons amounting to 0.2 to 10 times the volume of the catalyst, under absolute pressures of about 10 to 100 bars.

The following examples are given for illustrative purposes:

EXAMPLE 1

Extrudates of silica are manufactured according to a process described in the French patent specification 1,544,156, for example by coagulation of a silica sol at a 100 g./liter concentration in a column filled with trichloroethylene at 70° C. Trichloroethylene is thereafter withdrawn by azeotropic distillation. The obtained microballs are washed to pH 9 by means of diluted ammonium hydroxide (the diameters of the balls are between 100 and 800 microns). They are agglomerated by means of a device such as described in the aforesaid patent.

1 kg. of the thus obtained extrudates are immersed in an excess of "super 110" phosphoric acid solution of a 80% $P_2O_5$ content, said solution having been previously heated up to 100° C. These silica extrudates have a specific surface of 250 m.$^2$/g., a porous volume of 1.2 cm.$^3$/g., a resistance to crushing (grain to grain) of 9 kg. and a content by weight of alkali metals of 0.9%, as expressed in $Na_2O$. These extrudates are immersed in the solution, and the impregnated extrudates are centrifugated. After centrifugation, the catalyst is calcinated in a rotatable oven, by means of an air current, for 2 hours at 250° C., and constitutes catalyst A.

After calcination, the average resistance to crushing, grain to grain, of catalyst A is 15 kg., its total $P_2O_5$ content is 65% by weight, its content of $P_2O_5$ extractable with water in one hour at room temperature (for example 20° C.) is 48% and its total acidity, expressed as neutralization heat with respect to ammonia at 200° C., is 198 cal./g.

By way of comparison, a catalyst $S_1$ is manufactured from a conventional silica carrier which is impregnated in the same manner as before with the same solution of "super 110" phosphoric acid.

The carrier $S_1$ had a specific surface of 207 m.$^2$/g., a porous volume of 1.2 cm.$^3$/g., a resistance to crushing of 5 kg. and the same content of alkali metal compounds.

After impregnating and calcination of this carrier, for 2 hours at 250° C., there is obtained a conventional catalyst $S_1$ with the following characteristics:

average resistance to crushing (grain to grain): 10 kg.
percent total $P_2O_5$: 65% by weight
percent $P_2O_5$ extractable with water at 20° C. (room temperature): 44%
total acidity (heat of neutralization by ammonia): 186 cal./g.

These two catalysts have a molar ratio of $P_2O_5$ to $SiO_2$ of 0.78. They have been tested in the polymerization of olefins of a L.P.G. cut having the following percent composition by weight:

| | |
|---|---|
| Propane | 0.25 |
| Propylene | 0.33 |
| Iso-butane | 2.14 |
| n-Butane | 2.57 |
| 1-butene | 48.69 |
| Isobutene | 31.39 |
| Trans 2-butene | 7.71 |
| Cis 2-butene | 4.70 |
| Butadiene | 2.22 |

The reaction temperature is 170° C., the pressure 40 bars and the hourly feed rate of liquid L.P.G. 1 to 4 times the catalytic volume.

The results are given in Table I.

TABLE I

| Catalyst | V.V.H. | Conversion rate, percent * | Density of the product, g./cm.$^3$ | Octane number |
|---|---|---|---|---|
| A | 1 | 95 | 0.715 | 99 |
|  | 2 | 91 | 0.711 | 100 |
|  | 4 | 85 | 0.708 | 100 |
| $S_1$ (conventional) | 1 | 91 | 0.723 | 95 |
|  | 2 | 86.5 | 0.716 | 97 |
|  | 4 | 78 | 0.711 | 98 |

*The percent conversion rate relates to the percentage of reacted olefins with respect to the total amount of introduced olefins, for one run.

It is thus clear that catalyst A of this invention:

is more active (higher conversion rate) than the conventional catalyst, manufactured from a conventional silica carrier.
is more selective
has a higher strength

EXAMPLE 2

Example 1 is repeated with the same carriers, i.e.:

either the carrier according to French patent specification 1,544,156, leading to catalysts B, C and D
or the conventional carrier leading to comparative catalyst $S_2$ The impregnation is carried out as herebefore, but the calcination temperature has been varied as shown in Table II.

TABLE II

| Catalyst | Calcination temperature, ° C. | Percent Total $P_2PO_5$ | Percent $P_2O_5$ extractable with water | Total acidity, cal./g. | Resistance to crushing, kg. |
|---|---|---|---|---|---|
| B | 300 | 65.5 | 42 | 151 | 17 |
| C | 350 | 66.5 | 37 | 105 | 19 |
| D | 400 | 67 | 30 | 60 | 20 |
| $S_2$ (conventional) | 300 | 65.5 | 38 | 125 | 12 |

These 4 catalysts have been used for polymerizing propylene under the following conditions:

T=170° C.    P=47 bars

V.V.H. (volume of liquid propylene per volume of catalyst and per hour)=2

The results are given in Table III.

These results show that catalysts B, C and D of this invention are substantially more active and selective than the conventional catalyst. The production per run is higher, and the amounts of by-products are lower.

2. A catalyst according to claim 1, wherein the microballs of silica hydrogel result from coagulating a silica sol in a liquid substantially immiscible with water, said silica sol itself resulting from reacting an acid with sodium silicate, said microballs being thereafter washed in a medium of pH between 8 and 12.

3. A catalyst according to claim 1, wherein the agglomerates of silica hydrogen microballs have a specific surface of at least 200 m.²/g.

4. A catalyst according to claim 3, wherein the agglomerates of silica hydrogel microballs have a specific surface between 200 and 300 m.²/g.

5. A catalyst according to claim 1, wherein the agglomerates of silica hydrogel microballs have a porous volume between 1 and 1.5 cm.³/g.

6. A catalyst according to claim 1, wherein the compound convertible to phosphoric anhydride is an ortho- pyro-, meta-, poly- or super-phosphoric acid.

7. A catalyst according to claim 1, wherein the calcination takes place at a temperature between 200 and 700° C.

8. A catalyst according to claim 1, containing phosphoric anhydride in a molar ratio with respect to silica between 0.7 and 1.5.

9. A process for polymerizing olefinic hydrocarbons, said process comprising contacting said hydrocarbons with a catalyst as defined by claim 1.

10. The process of claim 9, wherein the reaction temperature is between 140 and 350° C., the hourly volumetric feed rate of said olefinic hydrocarbons being 0.2 to 10 times the catalytic volume and the absolute pressures being in the range of 10 to 100 bars.

11. A process of alkylating an aromatic hydrocarbon with an olefin, said process comprising reacting said olefin with said aromatic hydrocarbon in the presence of a catalyst as defined by claim 1.

12. The process of claim 11, wherein the reaction temperature is between 140 and 350° C., the hourly volumetric feed rate of said olefinic hydrocarbons being 0.2 to 10 times the catalytic volue and the absolute pressures being in the range of 10 to 100 bars.

References Cited

UNITED STATES PATENTS

| | | | |
|---|---|---|---|
| 2,382,318 | 8/1945 | Ipatieff et al. | 260—671 |
| 2,860,173 | 11/1958 | Jones et al. | 260—671 |
| 3,112,350 | 11/1963 | Bielawski et al. | 260—683.15 |
| 3,132,109 | 5/1964 | Morrell | 252—435 |
| 3,248,341 | 4/1966 | Louvar | 252—435 |

CURTIS R. DAVIS, Primary Examiner

U.S. Cl. X.R.

252—435; 260—683.15

Starting from the same basic product, and varying the calcination temperature, and accordingly the total acidity and the amount of $P_2O_5$ extractable with water at room temperature, it is possible to obtain catalysts the selectivity of which is adapted to various productions.

Thus, as long as the total acidity and the content of $P_2O_5$ extractable with water are reduced, oligomers appear which are heavier and heavier.

These two factors are of major importance with respect to the selectivity of the catalyst. When they are respectively 40 to 45% and 140 to 160 cal./g. (catalyst B), the catalyst may be used for producing nonenes with a production of dodecenes which is higher than that obtained with conventional catalysts. When they are respectively about 35 to 40% and 90 to 120 cal./g. (catalyst C), the catalyst is able to produce both nonenes and dodecenes; at about 27 to 33% and 50 to 70 cal./g. (catalyst D), dodecenes and oligomers higher than $C_{12}$ are mainly obtained.

TABLE III

|  | Catalyst | | | |
|---|---|---|---|---|
|  | $S_2$ | B | C | D |
| Conversion rate per run, percent | 86 | 92 | 93.5 | 97 |
| Production per run in kg./kg. catalyst/hour: | | | | |
| Total product | 0.894 | 0.957 | 0.972 | 1.009 |
| By-products* | 0.059 | 0.022 | 0.027 | 0.049 |
| Products: | | | | |
| $<C_9^=$ | 0.196 | 0.145 | 0.066 | 0.054 |
| $C_9^=$ | 0.469 | 0.543 | 0.463 | 0.346 |
| $C_{10}^=+C_{11}^=$ | 0.016 | 0.018 | 0.024 | 0.029 |
| $C_{12}^=$ | 0.103 | 0.190 | 0.312 | 0.382 |
| $>C_{12}^=$ | 0.051 | 0.039 | 0.080 | 0.149 |
| Selectivity, percent: | | | | |
| $C_9^=$ | 52.5 | 56.7 | 47.6 | 34.3 |
| $C_{12}^=$ | 11.5 | 19.9 | 32.1 | 37.9 |
| $>C_{12}^=$ | 5.7 | 4.1 | 8.2 | 14.8 |

*The by-products are paraffins, di-olefins, tri-olefins and aromatic hydrocarbons.
Note.—By $C_x^=$ there is meant olefins containing $x$ carbon atoms; for example $C_9^=$ means nonene.

EXAMPLE 3

Using the process and silica carriers of Example 1, two catalysts E and $S_3$ are manufactured which are thereafter calcinated, after impregnation, for 2 hours at 450° C., the conventional carrier being used for manufacturing $S_3$. The characteristics of these catalysts are given in Table IV:

TABLE IV

| Catalyst | Total $P_2O_5$ | Percent $P_2O_5$ extractable with water at room temperature | Total acidity (cal./g.) | Resistance to crushing (kg.) |
|---|---|---|---|---|
| E | 68.5 | 23 | 40 | 24 |
| $S_3$ (conventional) | 68.5 | 18 | 28 | 14 |

These two catalysts have been tested in the process of alkylating benzene by means of a gaseous mixture of 20% ethylene and 80% ethane by volume.

The operating conditions are as follows:

pressure: 70 bars
temperature: 325° C.
molar ratio of benzene to ethylene=7
hourly feed rate of liquid benzene: 2 times the volume of the catalyst.

The results are given in Table V.

TABLE V

| Catalyst | Conversion rate of ethylene, percent | Molar selectivity with respect to ethylene | | |
|---|---|---|---|---|
|  |  | Ethylbenzene | Diethylzene | Triethylbenzene |
| E | 98 | 95 | 3.5 | 1.5 |
| $S_3$ (conventional) | 87 | 90 | 4 | 1 |

This clearly shows the improved results obtained by this invention.

EXAMPLE 4

Two catalysts F and $S_4$ are manufactured according to the process of Example 1, starting from the same carriers. After impregnation, they have been subjected to calcination for 2 hours at 600° C.

Their characteristics are given in Table VI.

TABLE VI

| Catalyst | Total $P_2O_5$ | Percent $P_2O_5$ extractable with water at room temperature | Total acidity (cal./g.) | Resistance to crushing (kg.) |
|---|---|---|---|---|
| F | 71 | 9 | 10 | 37 |
| $S_4$ (conventional) | 70 | 5 | 4 | 14 |

These catalysts have been used in a pilot plant for producing heptenes by co-dimerization of 1-butene and propylene in the following conditions:

$$T=225° C.$$
$$P=70 \text{ bars}$$

Hourly volumetric liquid feed rate (1—butene+propylene)=4.25 times the volume of the catalyst.
Ratio of 1-butene to propylene by weight=2

The charge contained 1% of di-olefins (butadiene and propadiene), 100 parts per million of acetylenic compounds, and water (see Table VII)

TABLE VII

| Hours of run | Water in the charge, p.p.m. | Conversion rate* of— | | Selectivity to heptene of— | |
|---|---|---|---|---|---|
|  |  | $S_4$ | F | $S_4$ | F |
| 1 | 1,500 | 70 | 64 | 21 | 28 |
| 30 | 1,500 | 74 | 65 | 20.5 | 27 |
| 150 | 1,500 | 80 | 68 | 18 | 26 |
| 300 | 1,500 | 87 | 75 | 16 | 25 |
| 330 | 200 | 87 | 72 | 16 | 26 |
| 400 | 200 | 86 | 68 | 16 | 27 |
| 500 | 200 | 84 | 64 | 17 | 28.5 |
| 600 | 200 | 81 | 58 | 18 | 29.5 |
| 630 | 1,500 | 83 | 62 | 17 | 29 |
| 700 | 1,500 | 86 | 66 | 16 | 27.5 |
| 800 | 1,500 |  | 71 |  | 26.5 |
| 200 | 1,500 |  | 76 |  | 25 |
| 1,000 | 200 |  | 69 |  | 27 |

*The conversion rate is given with respect to the two starting olefins and the selectivity is given with respect to the converted olefins.

Table VII shows:

That a high water content of the feed charge (1,500 p.p.m.) results in killing the conventional catalyst (the unit containing the catalyst $S_4$ could not operate over 700 hours). On the contrary catalyst F of this invention is water-resisting, That the yield of heptene (i.e. the product of the conversion rate by the selectivity) is always higher with catalyst F than with the conventional catalyst $S_4$. For example, after 300 hours of run, the yields were respectively 13.9 for $S_4$ and 18.8 for F, That catalyst F has a longer life time than the conventional catalyst, That catalyst F may be regenerated: if the water content of the charge is brought back to a normal value (about 200 p.p.m.), the catalyst recovers its initial activity and selectivity, On the contrary, the conventional catalyst is killed. This is of high importance since uncontrollable changes of the water content frequently occur.

What we claim is:

1. The catalyst resulting from impregnating a silica carrier by means of phosphoric anhydride or a compound convertible to phosphoric anhydride, and thereafter calcinating the impregnated carrier, said carrier consisting of agglomerates of microballs of silica hydrogel, said microballs having a size of the order of about 100-800 microns.

UNITED STATES PATENT OFFICE
CERTIFICATE OF CORRECTION

Patent No. __3,586,729__          Dated __June 22, 1971__

Inventor(s) __Bernard Juguin and Jean Francois Le Page__

It is certified that error appears in the above-identified patent and that said Letters Patent are hereby corrected as shown below:

In the Specification:

Col. 4, Table I, after "A" and "S₁ (conventional)" please delete the vertical column of six 0's.

Col. 6, Table VII, in the column of "Hours of run", below "800" and above "1,000" delete "200" and insert ---900---.

In the Claims:

Claim 2, line 6, delete "12" and insert ---11---.

Claim 12, line 4, "volue" should be ---volume---.

Signed and sealed this 15th day of August 1972.

(SEAL)
Attest:

EDWARD M. FLETCHER, JR.            ROBERT GOTTSCHALK
Attesting Officer                  Commissioner of Patents